United States Patent
Bonardi et al.

(10) Patent No.: US 6,433,060 B1
(45) Date of Patent: Aug. 13, 2002

(54) VINYL CHLORIDE-BASED POLYMERS CAPABLE OF GIVING PLASTISOLS HAVING SPECIFIC PROPERTIES, AND PROCESS FOR OBTAINING THEM

(75) Inventors: Christian Bonardi, Saint Genis-laval; Bernard Bonnaud, Sisteron; André Chippaux, Lyons; Richard Peres, Saint Auban sur Durance, all of (FR)

(73) Assignee: Atofina (FR)

( * ) Notice: Subject to any disclaimer, the term of this patent is extended or adjusted under 35 U.S.C. 154(b) by 0 days.

(21) Appl. No.: 09/474,587

(22) Filed: Dec. 29, 1999

(30) Foreign Application Priority Data

Dec. 29, 1998 (FR) .............................................. 98 16527

(51) Int. Cl.⁷ .................................................. C08J 3/02
(52) U.S. Cl. ........................ 524/457; 524/742; 524/609; 524/612; 526/227; 526/344.2
(58) Field of Search .................................. 524/742, 609, 524/612, 457, 461; 526/227, 344.2, 344, 201

(56) References Cited

U.S. PATENT DOCUMENTS 3,876,597 A * 4/1975 Sturt ........................... 260/29.6
4,091,197 A * 5/1978 Fischer et al. ................. 526/91
5,639,891 A * 6/1997 Steffier ........................ 530/417

* cited by examiner

Primary Examiner—David W. Wu
Assistant Examiner—William K Cheung
(74) Attorney, Agent, or Firm—Pennie & Edmonds LLP

(57) ABSTRACT

The present invention relates to a process for seeded microsuspension polymerization of vinyl chloride in aqueous medium under the action of at least one organosoluble initiator, at least one reducing agent and at least one water-soluble metal salt in the presence of at least one fatty acid alkali metal or ammonium salt. It also relates to the polymers obtained in this way which are suitable for giving plastisols having specific properties.

18 Claims, No Drawings

VINYL CHLORIDE-BASED POLYMERS CAPABLE OF GIVING PLASTISOLS HAVING SPECIFIC PROPERTIES, AND PROCESS FOR OBTAINING THEM

The present invention relates to a process for obtaining polymers based on vinyl chloride which are capable of giving plastisols having specific properties. More particularly, the invention relates to a process of seeded microsuspension polymerisation of vinyl chloride with or without one or more copolymerisable monomers.

It is known to use plastisols prepared from polymers based on vinyl chloride in the manufacture of various articles, such as floor and wall coatings, plastified coated fabrics, and mastics.

In view of the vigorous competition, many studies have been carried out for the purpose either of attempting to find new applications for these plastisols or of improving their properties.

A further subject of numerous studies has been processes for manufacturing polymers based on vinyl chloride which are capable of giving plastisols having specific properties, thereby opening up the way to new applications.

Japanese Patent Application JP 62-231594 discloses a process for manufacturing polymers based on vinyl chloride which are capable of giving plastisols having low viscosity, good thermal stability and good resistance to water absorption. The essential feature of this process is the presence of hydrotalcite, which is introduced into the reaction medium before or during the initial phase of polymerisation of the vinyl chloride.

Moreover, a process for preparing vinyl chloride polymers which is capable of giving plastisols having a low initial viscosity, stability in the viscosity in the course of storage, and good degassing properties has been described in French Patent FR 2163573. That document teaches working in an aqueous medium under the action of organosoluble initiators and water-soluble reducing agents, in the presence of alkali metal salts of higher fatty acids containing 8 to 18 carbon atoms and at least one compound selected from the group (A) consisting of higher alcohols and higher fatty acids having 8 to 18 carbon atoms.

Comparative Example 5 of the document FR 2163573 shows that a polymerisation of vinyl chloride conducted in the absence of a compound from group (A) leads to highly viscous plastisols which are poorly suited to degassing and have poor transparency.

Apart from the documents mentioned above, the literature provides no processes for obtaining plastisols having a set of appropriate properties, given the difficulty of improving simultaneously two or more of their properties. Thus the resistance to water absorption is often sacrificed for the benefit of thermal stability, or else good suitability to degassing at the expense of viscosity.

One aim of the present invention is to provide plastisols which lend themselves well to debubbling, or plastisols containing no air bubbles after kneading, while retaining or improving at least one of the following properties : thermal stability, resistance to discoloration, UV stability, transparency, rheology and hydrophobicity. The target plastisols are in particular those which lend themselves well to debubbling and have good thermal stability, those which lend themselves well to debubbling and have adequate hydrophobicity, and those which lend themselves well to debubbling and have good thermal stability and adequate hydrophobicity.

This aim is achieved in accordance with the present invention by a process of seeded microsuspension polymerisation of vinyl chloride with or without one or more polimerizable comonomers in an aqueous medium under the action of at least one organosoluble initiator, of at least one reducing agent selected from the group (S) consisting of alkali metal sulphoxylates, sulphites and metabisulphites, of at least one water-soluble metal salt selected from the group (M) consisting of salts of iron, copper, cobalt, nickel, zinc, titanium, vandium, manganese, chromium, cerium, of tin and of silver, in the presence of at least one alkali metal or ammonium salt of a fatty acid containing 8 to 22 carbon atoms.

The present invention firstly provides a process for obtaining latex containing polymer particles based on vinyl chloride, which consists in polymerising the corresponding monomer(s) in microsuspension in the presence of water, at least one water-soluble metal salt selected from the group (M), at least one alkali metal or ammonium salt of a fatty acid containing 8 to 22 carbon atoms, at least one reducing agent selected from the group (S), at least one seed polymer (P1) whose particles contain at least one organosoluble initiator and, if desired, at least one seed polymer (P2).

Microsuspension polymerisation, or polymerisation in microsuspension, means the polymerisation in the presence of organosoluble initiators of at least one monomer which is dispersed by means of mechanical energy in an aqueous medium containing an emulsifier as stabiliser to give a dispersion of particles whose average diameter is less than 5 $\mu$m.

Polymers based on vinyl chloride are the homopolymers and the copolymers, the latter containing at least 50% by weight of vinyl chloride and at least one monomer copolymerisable with vinyl chloride. The copolymerisable monomers are those generally employed in conventional techniques of copolymerising vinyl chloride. Mention may be made of vinyl esters of mono- and polycarboxylic acids, such as vinyl acetate, propionate and benzoate; unsaturated mono- and polycarboxylic acids, such as acrylic, methacrylic, maleic, fumaric and itaconic acid and their aliphatic, cycloaliphatic and aromatic esters, their amides, and their nitrites; vinyl halides and vinylidene halides; alkyl vinyl ethers; and olefins.

Preparation of the Seed Polymer (P1)

The seed polymer (P1) required for the polymerisation in accordance with the invention is prepared in accordance with conventional techniques of microsuspension polymerisation. It is present in the form of a dispersion of polymer particles whose average diameter is between 0.2 and 2 $\mu$m and, preferably, between 0.3 and 1 $\mu$m.

One means of preparing the polymer (P1) consists in employing water, vinyl chloride alone or in combination with one or more copolymerisable monomers, an organosoluble initiator and an anionic emulsifier alone or in combination with a non ionic emulsifier. The monomer or monomers are finely dispersed in water with the aid of a means of mechanical energy such as, for example, a colloid mill, high-speed pump, vibratory stirrer, ultrasound apparatus or high-pressure mixer disperser. The microsuspension obtained is then heated under autogenous pressure and with moderate stirring at a temperature which is generally between 30 and 65° C. Following the drop in pressure, the reaction is stopped and the unconverted monomer or monomers are outgassed.

The organosoluble initiators to be employed in the preparation of the polymer (P1) are represented by organic peroxides, such as diacyl peroxides (for example lauroyl, decanoyl or caproyl peroxides), tert-butyl diethylperacetate, dicetylhexyl percarbonate, diacetyl peroxide and dicetyl peroxocarbonate. The preferred initiators are those which are also insoluble in water.

The organosoluble initiator is selected such that its deployment in a reasonable amount makes it possible to obtain polymers (P1) containing between 1 and 10% by weight of this initiator for a preparation period of between 4 and 16 hours.

The proportion by mass of organosoluble initiator present in the particles of the polymer (P1) is advantageously between 1 and 4%.

The preferred organosoluble initiator is lauroyl peroxide.

Preparation of the Seed Polymer (P2)

The optional seed polymer (P2) is present in the form of a dispersion of polymer particles based on vinyl chloride whose average diameter is between 0.05 and 0.5 μm, and preferably between 0.08 and 0.2 μm.

This particle dispersion can be obtained by conventional techniques of emulsion polymerisation.

One means of preparing the polymer (P2) consists in employing water, vinyl chloride alone or in combination with a copolymerisable monomer, a water-soluble initiator and an anionic emulsifier with or without a non-ionic emulsifier.

The reaction mixture is heated under autogenous pressure and with moderate stirring at a temperature of between 30 and 65° C. Following the drop in pressure, the reaction is stopped and the unconverted monomer or monomers are degassed.

The water-soluble initiators required for the preparation of the polymer (P2) are generally represented by hydrogen peroxide, alkali metal or ammonium persulphates alone or together with water-soluble reductants, such as alkali metal sulphites or bisulphites. The amounts use, which vary greatly, depend on the initiator system selected and are adjusted so as to ensure polymerisation within times of between 4 and 12 hours.

Preparation of the Latex

In the process according to the invention, the amount of reducing agent employed is less than 0.1% by weight and, preferably, is between 30 and 200 ppm relative to the monomer(s) deployed.

The reducing agent which is advantageously selected is sodium or potassium metabisulphite.

Generally speaking, the reducing agent is used in the form of an aqueous solution with a concentration of between 1 and 100 g/l. A concentration of between 1 and 20 g/l is preferred.

Preferably, the introduction of this aqueous solution into the reaction medium is begun before the temperature of the said medium reaches the target polymerisation temperature, and is continued during the polymerisation at a rate which can be adjusted as a function of the cooling capacity of the reactor.

The reducing agent(s) selected from the group (S) can be used together with conventional reducing agents, i.e. those commonly used in microsuspension, such as, in particular, alkylphosphoric acids, lactones, ketones, carbazQnes, mono- or polycarboxylic acids, especially ascorbic acid, and derivatives thereof.

Among the conventional reducing agents, ascorbic acid is advantageously selected.

In accordance with the present invention, the amount of fatty acid alkali metal or ammonium salt employed is generally between 0.3 and 3% and, preferably, between 0.5 and 1.5% by weight relative to the monomer(s) deployed.

The carbon chain of the fatty acid can be linear or branched. It can be saturated or may include one or more unsaturated bonds. It may also include one or more hydroxyl or epoxy functions.

The preferred fatty acid ammonium or alkali metal salts are those containing 12 to 22 carbon atoms, such as, for example, the salts of lauric acid, myristic acid, palmitic acid or stearic acid.

The fatty acid ammonium salts containing 12 to 22 carbon atoms, or mixtures thereof, have proven to be of great interest.

The fatty acid salts can be employed in solid form, in suspension or in solution. However, it is preferred to use them in aqueous solution, even if dissolving them necessitates a temperature higher than the ambient temperature.

In accordance with the present invention, the fatty acid ammonium or alkali metal salts can be introduced into the reaction medium before and/or during and/or after the polymerisation. These fatty acid salts are advantageously introduced during the polymerisation.

The fatty acid salts can be formed in situ, by first introducing the fatty acid into the reaction medium and by injecting a base during the polymerisation until the fatty acid is completely neutralised.

In the process of the invention, the water-soluble metal salt selected from the group (M) is employed in an amount such that the mass ratio of metal salt to monomer(s) deployed is between 0.01 and 100 ppm, preferably between 0.05 and 10 ppm and, advantageously, between 0.1 and 5 ppm. Water-soluble copper salts are particularly preferred.

The water-soluble metal salt can be introduced before and/or during the polymerisation. It is preferably introduced before the polymerisation.

The total amount of polymers (P1) to be employed is between 0.5 and 10% by weight and, preferably, between 1 and 5% by weight relative to the monomer(s) deployed.

When working in the presence of at least one polymer (P2), the total amount of polymers (P2) to be employed is between 0.1 and 10% by weight and, preferably, between 0.5 and 5% by weight relative to the monomer(s) deployed.

In one preferred embodiment of the invention, both a polymer (P1) and a polymer (P2) are employed, the particles of (P2) having an average diameter smaller than that of the particles of (P1).

The amount of water required for the process according to the invention must be such that the initial concentration of seed polymers plus the monomer(s) deployed is between 20 and 80% and, preferably, between 45 and 75% by weight relative to the reaction mixture.

Although unnecessary, it is possible to add at least one anionic emulsifier to the reaction medium before and/or during and/or after the polymerisation, the said emulsifier being selected preferably from the group consisting of alkyl sulphates, alkylsulphonates, vinylsulphonates, arylsulphonates, alkylsulphosuccinates and alkali metal alkyl phosphates.

According to the invention, the reaction medium is heated under autogenous pressure at a temperature which is generally between 35 and 70° C. and, preferably, between 45 and 60° C.

The polymers based on vinyl chloride which are prepared by the process of the invention are separated from the polymerisation medium by any known means, such as filtration, coagulation/suction filtration, flaking, centrifugal decanting and drying. Separation is preferably carried out by drying and the polymers based on vinyl chloride are advantageously dried by atomisation.

The invention secondly provides the vinyl chloride-based polymer thus obtained which is suitable for the preparation of plastisols having specific properties.

The invention thirdly provides the preparation of these plastisols by mixing the vinyl chloride-based polymer thus obtained with a plasticizer. The invention additionally provides the plastisols thus prepared.

EXPERIMENTAL SECTION

I—Preparation of the Seed Polymer (P1)

The following constituents (by weight) are introduced in succession into a reactor which is stirred at 35 rpm and regulated to 15° C.

- 120 parts of water,
- 0.14 part of monopotassium phosphate,
- 0.02 part of sodium hydroxide,
- $3.4 \times 10^{-3}$ parts of paraquinone powder,
- 1.88 parts of lauroyl peroxide,
- 100 parts of vinyl chloride,
- and 1.5 parts of sodium dodecylbenzenesulphonate in the form of a 10% aqueous solution, the reactor being placed under vacuum just before introducing the vinyl chloride.

The vinyl chloride is subsequently dispersed finely in the aqueous medium at a temperature of less than or equal to 35° C., by stirring the said medium at 5500 rpm for 105 minutes. The reaction medium is then brought to the target polymerisation temperature of 45° C. under autogenous pressure, while stirring at a rate of 30 rpm. The paraquinone is then introduced continuously at a constant rate of 0.033 part by weight/h.

After the drop in pressure to a value of 3.5 bars, the unreacted vinyl chloride is outgassed.

II—Preparation of the Seed Polymer (P2)

The following components (by weight) are introduced into a reactor fitted with a stirrer 138 parts of water, an aqueous solution containing 0.5 part of lauric acid and 0.15 part of sodium hydroxide.

The reactor is subsequently placed under vacuum prior to the introduction of 100 parts of vinyl chloride. The reaction medium is then brought to the target temperature of 58° C.

When the medium reaches 45° C., an aqueous solution containing 0.05 part of potassium persulphate per 14 parts of water is introduced continuously. Two hours after the beginning of introduction of this solution containing 1.3 parts of sodium dodecylbenzenesulphonate is added continuously at a constant rate for 8 hours.

When the internal pressure is 4 bars, the unreacted vinyl chloride is recovered under vacuum and then the reactor is aerated and then cooled.

EXAMPLE 1

The following components are introduced in succession, by suction into an 800 litre reactor which is equipped with a stirrer and has been placed under vacuum beforehand

- 430 kg of demineralised water
- 80 g of monopotassium phosphate ($KH_2PO_4$) and 0.63 g of copper sulphate ($CuSO_4.5H_2O$), which are dissolved beforehand in 1 litre of water,
- 16 kg, as reckoned in the dry state, of the seed polymer latex (P1) whose particles have an average diameter of close to 0.55 $\mu$m and contain 2% by weight of lauryl peroxide relative to the polymer,
- 6 kg, as reckoned in the dry state, of the seed polymer latex (P2) whose particles have an average diameter of 0.13 $\mu$m The reaction medium is stirred at approximately 80 rpm at ambient temperature and then the reactor is placed under vacuum again for approximately 30 minutes. Subsequently, 400 kg of vinyl chloride are introduced, after which the reaction medium is brought to the target temperature of 54° C. When the temperature of the medium reaches 49° C., an aqueous solution of potassium metabisulphite is introduced continuously. An hour after the temperature of the medium has reached 49° C., an aqueous solution of ammonium myristate, prepared beforehand from myristic acid and ammonium and maintained at a temperature of 45° C., is introduced.

When the pressure of the medium is 4 bars, or after 8 hours of polymerisation, the introduction of the aqueous solutions is stopped and the reactor is cooled.

The total amounts of potassium metabisulphite and of ammonium myristate are 14 g and 3.2 kg respectively.

The polymer concentration in the latex is 44.6%.

The polymer particles are subsequently recovered in an atomisation drying unit, followed by a step of milling.

The plastisol is subsequently prepared by mixing 100 parts by weight of the powder obtained from the atomisation with 40 parts of di(2-ethylhexyl) phthalate and 2 parts of stabiliser (zinc, calcium, tin salt).

The hydrophobicity, debubblability and thermal stability, which are indicated in Tables 1 and 2, are measured as described below Hydrophobicity By measuring the contact angles of a drop of water deposited on a gelled and coated plastisol it is possible to determine the hydrophobic power of this plastisol. In fact, the internal angle which the tangent of the liquid drop makes with the coating at the point of contact can be related to the critical surface tension of the coating using the Zisman equation:

$$\cos \theta = 1 - M((\gamma_L - \gamma_C)$$

where $\theta$ represents the contact angle

M is a constant $\gamma_L$ represents the critical surface tension of the liquid $\gamma_C$ represents the critical surface tension of the coating.

When water is used as reference, the value of $\gamma_L$ is 70.6 mN/m.

Specifically, in order to decrease the hydrophobicity, it is necessary to increase the contact angle.

The measurement is made using a Sony Colour Video Camera CCD—Iris equipped with an 18–108 mm zoom, which is slightly inclined to allow it to be focused on the water-coating contact zones.

A calibrated water drop of 5 $\mu$l is allowed to form a bead at the end of the needle of a 25 $\mu$l syringe, and then the coating is brought towards this drop. When contact takes place, the drop becomes detached naturally. It is illuminated using a Leica CLS 100 system, using only one of the two orientable sources, which is placed facing the objective. This arrangement allows video to be shot against the light, whose intensity can be modified with the diaphragm of the objective. The backlighting gives a good definition of the contour of the drop.

The photo is taken one minute after depositing the drop, using a Sony Trinitron Super Fine Pitch monitor and the Sony Colour Video Printer UP-3000 P.

The value given in Table 1 is the mean of the angles—left and right—measured.

Debubblability

The density of the plastisol before debubbling is determined by weighing an empty beaker of known volume and then weighing the same beaker filled to the brim with the plastisol.

The plastisol is subsequently placed in a multidebubbler, which is equipped with a vibrator and operates in accordance with the following principle When the multidebubbler is placed under vacuum, and under the action of the vibrator, the plastisol containing air bubbles dilates and its level rises slightly; then, by bringing the pressure within the multidebubbler to atmospheric pressure, the dilated plastisol falls back to its initial level. This operation is repeated every 5 minutes and then the density of the plastisol is measured after each operation. The gas bubbles are considered to have been removed completely when the density of the plastisol shows no further change after 2 successive operations.

A plastisol is said to have good debubblability when either its initial density is high or the increase in its density per pass under the action of the vibrator is high.

Thermal Stability

The plastisol, from which air bubbles have been removed beforehand, is coated onto siliconised paper and the size of the gap under the coating bar is controlled so as to give a 0.9 mm thick gelled coating after 3 and 10 minutes at 200° C. in an oven. The yellowing index YI is then measured with the aid of a Hunterlab calorimeter.

EXAMPLE 2

The above procedure is repeated except that the amount of seed polymer (P2) is reduced to 4 kg and the total amount of ammonium myristate introduced is 4.8 kg.

EXAMPLE 3

The procedure of example 1 is repeated except that the amount of seed polymer (P2) is reduced to 4 kg and, in addition, an aqueous solution containing 4 kg of sodium dodecylbenzenesulphonate is introduced.

EXAMPLE 4

(comparative)

The procedure of Example 1 is repeated except that the amount of seed polymer (P2) is 16 kg, the ammonium myristate is replaced by sodium dodecylbenzenzsulphonate and the metabisulphite is replaced by 38 g of ascorbic acid.

The polymerisation time is six and a half hours and the concentration of polymers in the latex is 47.9%.

EXAMPLE 5

(comparative)

The procedure of Example 4 is repeated except that the amount of seed polymer (P2) is 14 kg and the amounts of ascorbic acid and copper sulphate are 28 g and 0.42 g respectively.

The polymerisation time is 5 hours and the concentration of polymers in the latex is 47.5%.

The characteristics of the plastisol prepared from polymers obtained in this way are substantially the same as those of Example 4.

EXAMPLE 6

(comparative)

The procedure of Example 5 is repeated except that the dodecylbenzenesulphonate is replaced by ammonium myristate.

The reaction is very slow and the concentration of polymers in final latex is only 36.3%.

The polymers obtained were not evaluated in application.

EXAMPLE 7

The procedure of Example 1 is repeated except that the amount of polymer (P2) is 14 kg.

EXAMPLE 8

The procedure of Example 1 is repeated except that the ammonium myristate is replaced by ammonium laurate.

EXAMPLE 9

This example differs from Example 8 in the use of ammonium palmitate in place of the laurate.

EXAMPLE 10

The procedure of Example 9 is repeated except that ammonium stearate is used.

EXAMPLE 11

Relative to Example 1, a commercial mixture of fatty acid salts, called Disponil OXS 970, is used, containing the same ratio of fatty acid salts to monomer deployed.

EXAMPLE 12

Example 1 is reproduced using the commercial product Cecavon AM 230, which contains primarily a mixture of fatty acid ammonium salt having saturated palmitic and stearic chains, in place of the ammonium myristate, while retaining the same ratio of fatty acid salt to monomer.

EXAMPLE 13

(comparative)

Example 1 is repeated except that the polymerisation is carried out in the absence of copper salt.

After reaction for 15 hours, the concentration of polymers in the latex is only 36%.

The polymers obtained were not evaluated in application because, in the absence of copper salt, the polymerisation is too slow to be utilised industrially.

TABLE 1

| EXAMPLES | 1 | 2 | 3 | 4* |
|---|---|---|---|---|
| Thermal stability (YI) Ca/Zn at 3' | 6.3 | 7.4 | 7.1 | 7.1 |
| Thermal stability (YI) Ca/Zn at 10' | 18.1 | 20.6 | 14.2 | 50 |
| Thermal stability (YI) Sn at 3' | 3.2 | 3.9 | 4.2 | 6.6 |
| Thermal stability (YI) Sn at 10' | 10.1 | 14 | 11.4 | 14 |
| Contact angle (degrees) | 73 | 72 | 64 | 5 |
| Density before debubbling | 1.15 | 1.15 | 1.19 | 0.98 |
| Density after 10 minutes of debubbling | 1.20 | 1.23 | 1.24 | 1.00 |

* = comparative example

TABLE 2

| EXAMPLES | 7 | 8 | 9 | 10 | 11 | 12 |
|---|---|---|---|---|---|---|
| Thermal stability (YI) Sn at 3' | 3.8 | 3.9 | 4.3 | 4.5 | 5.4 | 4.8 |
| Density before debubbling | 1.15 | 1.16 | 1.19 | 1.14 | 1.19 | 1.17 |
| Density after 10 minutes of debubbling | 1.23 | 1.20 | 1.22 | 1.20 | 1.23 | 1.20 |

What is claimed is:

1. Process for obtaining latex containing polymer particles based on vinyl chloride, by polymerising the corresponding monomer(s) in microsuspension in the presence of water, one or more water-soluble metal salts selected from the group consisting of salts of iron, copper, cobalt, nickel, zinc, titanium, vandium, manganese, chromium, cerium, of tin and of silver, one or more alkali metal or ammonium salts of a fatty acid containing 8 to 22 carbon atoms, at least one reducing agent selected from the group consisting of alkali metal sulphoxylates, sulphites and metabisulphites, and at least one first seed polymer whose particles contain at least one organosoluble initiator.

2. Process according to claim 1, wherein the fatty acid salt(s) contain(s) 12 to 22 carbon atoms.

3. Process according to claim 1, wherein the ratio by mass of water-soluble metal salt to monomer(s) deployed is between 0.01 and 100 ppm.

4. Process according to claim 1, wherein the water-soluble metal salt is a copper salt.

5. Process according to claim 1, wherein the amount of fatty acid alkali metal or ammonium salt employed is between 0.3 and 3% by weight relative to the monomer(s) deployed.

6. Process according to claim 1, wherein the reducing agent is selected from the group consisting of alkali metal sulphite and metabisulphite.

7. Process according to claim 1, wherein the reducing agent can be used jointly with conventional reducing agents.

8. Process for obtaining polymers based on vinyl chloride, wherein the latex obtained according to claim 1 is dried.

9. Process for obtaining plastisols based on vinyl chloride, wherein the polymers according to claim 8 are mixed with a plasticizer.

10. Process according to claim 1, wherein the organosoluble initiator is selected from the group consisting of diacyl peroxides, tert-butyl diethylperacetate, dicetylhexyl percarbonate, diacetyl peroxide and dicetyl peroxocarbonate.

11. Process according to claim 1, wherein the proportion by mass of organosoluble initiator in the particles of the first seed polymer is between 1 and 4%.

12. Process according to claim 1, wherein the organosoluble initiator is insoluble in water.

13. Process according to claim 1, wherein the first seed polymer is present in the form of a dispersion of particles whose average diameter is between 0.2 and 2 $\mu$m.

14. Process according to claim 13, wherein the average diameter is between 0.3 and 1 $\mu$m.

15. Process according to claim 1, wherein the first seed polymer can be used jointly with at least one second seed polymer whose particles contain at least one water-soluble initiator.

16. Process according to claim 15, wherein the second seed polymer is present in the form of a dispersion of particles whose average diameter is between 0.05 and 0.5 $\mu$m.

17. Process according to claim 16, wherein the average diameter is between 0.08 and 0.2 $\mu$m.

18. Process according to claim 5, wherein the amount of fatty acid alkali metal or ammonium salt employed is between 0.5 and 1.5% by weight relative to the monomer(s) deployed.

* * * * *